United States Patent [19]

Stevenson

[11] 3,873,203

[45] Mar. 25, 1975

[54] DURABLE HIGH RESOLUTION SILICON TEMPLATE

[75] Inventor: Alden Stevenson, Scottsdale, Ariz.

[73] Assignee: Motorola, Inc., Franklin Park, Ill.

[22] Filed: Mar. 19, 1973

[21] Appl. No.: 342,668

[52] U.S. Cl. .................... 355/133, 96/36.2, 96/38.3, 354/354, 355/125

[51] Int. Cl. .................... G03b

[58] Field of Search ............. 355/133, 125; 96/36.2, 96/38.3; 161/DIG. 7; 117/45; 354/354

[56] References Cited

UNITED STATES PATENTS

| | | | |
|---|---|---|---|
| 3,508,982 | 4/1970 | Shearin | 96/36.2 |
| 3,639,185 | 2/1972 | Colom et al. | 96/36.2 |
| 3,644,134 | 2/1972 | Widmann et al. | 117/45 |
| 3,720,143 | 3/1973 | Hashimoto et al. | 96/38.3 |
| 3,743,417 | 7/1973 | Smatlak | 355/133 |
| 3,743,847 | 7/1973 | Boland | 96/36.2 |
| 3,758,326 | 9/1973 | Hennings et al. | 96/36.2 |

*Primary Examiner*—Richard L. Moses
*Attorney, Agent, or Firm*—Vincent J. Rauner; Henry T. Olsen

[57] ABSTRACT

A template including a polycrystalline silicon layer on a glass substrate and a protective coating on the polycrystalline silicon layer and method of manufacturing same. In one embodiment, the protective coating is an oxide layer which protects the silicon layer from abrasive damage and further functions as a mask to silicon etchant during manufacture of the template, to provide a template having substantially improved resolution. A mixture of hydrazine and catechol is used as a silicon etchant, to eliminate fogging of the substrate material.

6 Claims, 6 Drawing Figures

DURABLE HIGH RESOLUTION SILICON TEMPLATE

RELATED APPLICATIONS

The subject matter of this invention is related to that of copending U.S. Patent Application Ser. No. 148,799, now U.S. Pat. No. 3,743,847 filed in the name of Bernard W. Boland and assigned to the Assignee of the instant application.

BACKGROUND OF THE INVENTION

1. Field of the Invention

This invention relates to templates, such as are used to mask ultraviolet light in semiconductor device manufacture. More particularly, the invention relates to templates having a thin polycrystalline silicon layer formed on a glass substrate, and methods of manufacture thereof.

2. Description of the Prior Art

Presently employed techniques for the manufacture of monolithic integrated circuits, thin film circuits, and other types of microcircuits employ a number of selective diffusion and selective deposition operations, said operations being carried out by the means of a suitable mask deposited on the microcircuit surface which is to be subjected to the particular operation (frequently an etching operation or a diffusion or ion implantation operation) to be performed. Such masks are generally formed by depositing a layer of photoresist on the surface to be masked, and subsequently photo-etching the photoresist masking layer. The photoresist is typically a material sensitive to ultraviolet light, and exposure is accomplished by a contact printing process employing a suitable printing template in direct contact with the photoresist masking layer. The term template as used hereinafter is intended to include photomasks, also simply called masks, as utilized in the semiconductor industry to pattern photoresist layers. Photoresist is usually designed to be sensitive to ultra-violet light, rather than visible light, so that the photoresist and wafers having layers of photoresist thereon may be handled under ordinary lighting conditions without causing undesired exposure of the photoresist. This contact printing of the photoresist masking layer is necessitated by the required high resolution and close tolerances of the resultant diffusion or deposition mask. A widely used contact printing template includes a glass slide which has been coated with a photosensitive silver emulsion which has been subsequently exposed so that a desired pattern of variable ultraviolet transparency is created in the template.

However, due to abrasion between the emulsion template and the photoresist masking layer, this template becomes rapidly degraded and must be discarded after being used only a few times if the required resolution and tolerances are to be maintained. Templates utilizing a substantially harder chrome metal coating on the glass slide have been utilized which are more durable, but also substantially more expensive than the photosensitive emulsion type. Other templates using silicon monoxide layers on the glass slide are unsatisfactory because of poor resolution due to the great thickness of the silicon monoxide layer, and due to fogging of the glass slide by the HF-type etchants which must be used. In the aforementioned copending application of Bernard W. Boland a think layer of polycrystalline silicon, typically approximately one thousand angstroms in thickness, overcomes many of the short-comings of the prior art by providing improved resolution due to the thinness of the polycrystalline silicon layer, improved durability of the templates due to the toughness and adherence of the polycrystalline silicon to the glass slide, and improved utility due to the fact that the polycrystalline silicon layer is transparent to visible light while being opaque to ultraviolet light, allowing more rapid and accurate alignment of the template to the semiconductor device. In the Bernard W. Boland invention, in the method of manufacturing the template the photoresist layer is formed directly on the polycrystalline silicon layer and then patterned. However, the silicon etchant used to remove the exposed polycrystalline material may tend to cause lifting of the photoresist and undercutting of the polycrystalline silicon, causing a degradation in the resolution of the template. Further, the etchants commonly used for etching silicon tend to cause some fogging of the glass substrate, decreasing its utility.

The present invention solves the above-mentioned problems of the prior art by providing a template with increased durability and greatly improved resolution.

SUMMARY OF THE INVENTION

In view of the foregoing considerations, it is an object of this invention to make an improved template.

It is another object of this invention to provide an improved template having a patterned polycrystalline silicon layer and a high-integrity protective oxide, nitride, or oxynitride coating on said polycrystalline silicon layer.

Another object of this invention is to provide a method for manufacturing a template of the type described wherein the high-integrity oxide coating is an etchant mask for the silicon etchant during the manufacture of the template.

It is yet another object of this invention to provide a method of manufacturing a template of a type described wherein the silicon etchant utilized is a mixture of hydrazine and catechol.

Briefly described, this invention provides an improved template and a method of manufacturing same. The template includes a patterned polycrystalline silicon layer on a glass substrate, the polycrystalline silicon layer having a protective coating thereon. The method includes the steps of depositing a layer of polycrystalline silicon on the glass substrate, forming the protective layer on the polycrystalline and subsequently patterning the protective layer and etching the silicon with a silicon etchant which does not cause fogging of the glass substrate, the protective layer acting as a mask against the silicon etchant, thereby providing a template having improved pattern resolution and durability.

DESCRIPTION OF THE INVENTION

Figure 5:
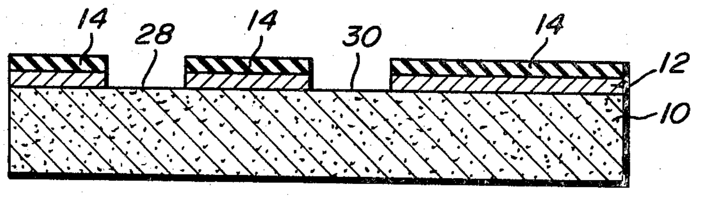

FIG. 5 is a cross sectional diagram of a template according to the invention. The template includes a glass substrate 10 which is transparent to both visible light and ultraviolet light. A thin patterned layer 12 of polycrystalline silicon is formed on glass substrate 10. The thickness of polycrystalline silicon layer 12 is chosen to provide optimized characteristics of filtering out ultraviolet light and transmitting visible light for photolithography in the manufacture of semiconductor devices wherein polycrystalline silicon layer 12 prevents ultraviolet light from exposing photoresist (deposited on a semiconductor wafer, for example) and yet permits easy alignment of the template to a pattern on the semiconductor wafer. A typical thickness could be approximately 1,000 angstroms, although thicknesses varying from less than one hundred angstroms to nearly 10,000 angstroms could be suitable used. However, very thin layers are difficult to obtain with a desired degree of uniformity, and very thick layers are difficult to pattern with the desired degree of accuracy. A thin silicon dioxide layer 14 is formed on the surface of polycrystalline silicon layer 12 and co-extensive therewith. The template in FIG. 5 is patterned so that areas 28 and 30 of glass substrate 10 are exposed. Areas 28 and 30 are relatively free of any "fogging" which would impair the transmission of either visible light or ultraviolet light.

A distinguishing feature of the template shown in FIG. 5 over the prior art is the silicon dioxide layer 14. Silicon dioxide layer 14 may be approximately 1,000 angstroms in thickness, although thicknesses from one hundred angstrom units to many thousand angstroms could be reasonably utilized. The presence of silicon dioxide layer 14 may provide additional durability for the template by preventing scratches and other such damage to polycrystalline silicon layer 12 due to abrasion caused by handling and contact with photoresist deposited on the microcircuit being fabricated. Further, as will be seen in the subsequent description of the manufacturing, silicon dioxide layer 14 plays an important role in providing substantially improved resolution of the template.

Figure 1:
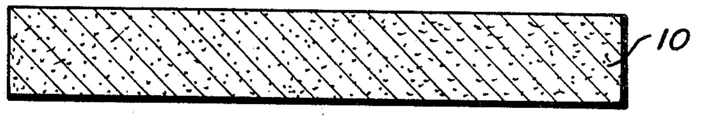
FIGS. 1–5 are cross sectional diagrams illustrating the sequence of manufacturing steps utilized according to the invention to obtain a template.
Figure 2:
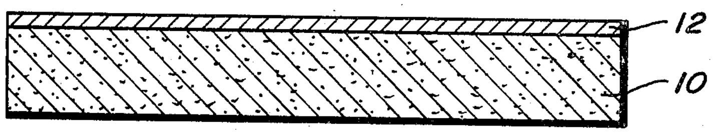
Figure 3:
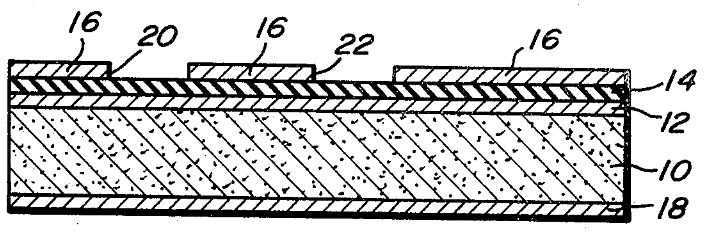

The method of manufacturing the template is now described, with references to FIGS. 1–5. FIG. 1 is a diagram of glass substrate 10. Glass substrate 10 is transparent to both visible and ultraviolet light, and may, for example, be an ultra-flat, polished soda-lime glass slide or borosilicate glass slide. A uniform, relatively thin polycrystalline silicon layer 12 is deposited on glass substrate 10, as is shown in FIG. 2. Polycrystalline silicon layer 12 may be deposited by gas phase decomposition of silane at a temperature below the melting point of substrate 10 and may be from less than 100 to 10,000 angstroms in thickness, although a thickness of approximately 1,000 angstroms is exemplary. The next step in the manufacture of the template according to the invention is the formation of silicon dioxide layer 14 on polycrystalline silicon layer 12, as shown in FIG. 3. $SiO_2$ layer 14 may be thermally grown on polycrystalline layer 12 by heating the substrate in oxygen, or by deposition of silicon dioxide on polycrystalline silicon layer 12. For either soda-lime or borosilicate glass slides it would probably be preferable that silicon dioxide layer 14 be deposited, rather than thermally grown, to obtain the desired thickness, since a thermally grown oxide grown at temperatures less than the melting point or distortion point of the glass slide would be very thin. It may be advantageous to form polycrystalline silicon layer 12 and silicon dioxide layer 14 in the same reactor, possibly by introducing oxygen into the reactor when the polycrystalline silicon layer 12 has attained the desired thickness. $SiO_2$ layer 14 may, for example, be approximately 1,000 angstroms in thickness, although thicknesses from several hundred to many thousand angstroms may also be suitable. Subsequent to the formation of $SiO_2$ layer 14, a photoresist layer 16 is provided thereon, using well known techniques, and an HF-resistant coating 18 is provided on the opposite surface of glass substrate 10. The substrate is then subjected to, for example, a buffered HF etchant, after the photoresist layer 16 has been partially exposed to ultraviolet light through a master template in contact with photoresist layer 16, and the undeveloped photoresist is removed, leaving openings 20 and 22 in photoresist layer 16, as shown in FIG. 3.

Figure 4:
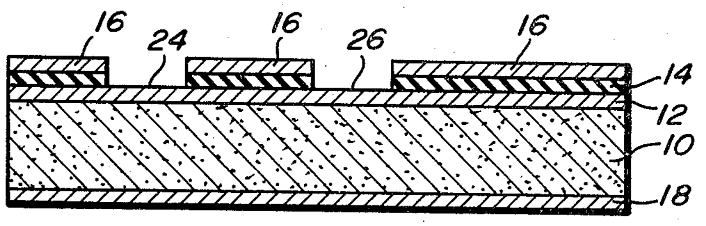

Referring to FIG. 4, it is seen that the HF etchant removes the exposed portions of $SiO_2$ layer 14, exposing areas 24 and 26 of polycrystalline layer 12. The HF etchant does not attack polycrystalline silicon layer 12. Protective layer 18, which may for example be a suitable wax or paraffin, prevents fogging of the bottom surface of glass substrate 10 by the HF etchant.

Those skilled in the art will recognize that if $SiO_2$ layer 14 is approximately 1,000 angstroms in thickness, the resolution of the boundaries defining exposed areas 24 and 26 is very high, since photoresist layer 16 is very adherent to $SiO_2$ layer 14, and there will be virtually no undercutting due to the thinness of $SiO_2$ layer 14. It should also be noted that if $SiO_2$ layer 14 is omitted, and patterned photoresist layer 16 is formed directly on polycrystalline silicon layer 12 and then subjected to a silicon etchant, serious undercutting of the silicon layer will occur and poor resolution of the defined pattern will result, because photoresist is not a good mask against known silicon etchants.

The next step in the manufacture of the template, as shown in FIG. 5, is the removal of protective layer 18. Then the substrate 10 is subjected to a silicon etchant, and the exposed portions 24 and 26 of polycrystalline silicon layer 12 are selectively removed to expose areas 28 and 30 of glass substrate 10, wherein the patterned $SiO_2$ layer 14 acts as a mask against the silicon etchant. The boundaries of areas 28 and 30 are of much higher resolution than would occur if photoresist had been used as a mask against the silicon etchant, because $SiO_2$ layer 14 is far more adherent to polycrystalline silicon layer 12, and in fact may be considered integral therewith. As a result, no lifting of $SiO_2$ layer 14 occurs during the silicon etching steps, and the amount of undercutting is reduced. According to this invention, the silicon etchant may be composed of hydrazine and catechol, as described in U.S. Pat. No. 3,160,539. This etchant attacks silicon, but does not affect glass or silicon dioxide at all, and no fogging of the exposed areas 28 and 30 of the template substrate 10 occurs, nor does any fogging of the bottom surface of glass substrate 10 occur.

It should be recognized that many other common silicon etchants, such as KOH, may be used. However, most of these etch glass to some extent, which may impair the transmission of visible light through the substrate. However, in some cases this effect may be negligible.

It should also be recognized that the terms "polycrystalline" silicon and "amorphous" silicon are sometimes used interchangeably. Although it is not presently known whether silicon can be deposited in a truly amorphous state, the intent is that the term polycrystalline silicon be construed to include all deposited silicon layers.

Figure 6:
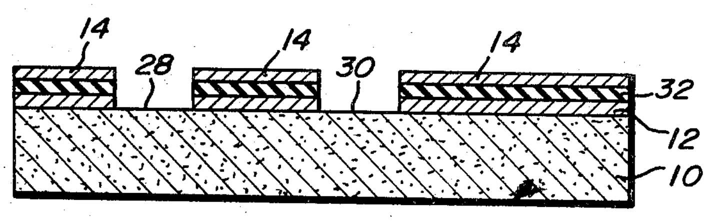
FIG. 6 is a cross sectional diagram of another embodiment of the invention.

In FIG. 6 another embodiment of the invention is depicted wherein the structure is similar to that of FIG. 5, except that a silicon nitride or oxynitride layer 32 is formed between and coextensive with polycrystalline silicon layer 12 and silicon dioxide layer 14. This embodiment would provide a more durable template than that shown in FIG. 5, since silicon nitride is more durable than silicon dioxide. Silicon dioxide layer 14 could be used as a mask against the nitride etchant (which may be hot phosphoric acid) during fabrication of the template to obtain improved resolution of the pattern, since common photoresists do not mask as efficiently against commonly used nitride etchants.

It should be recognized that the order of several of the previously described processing steps can be interchanged. For example, the order of providing photoresist layer 16 and protective layer 18 may be interchanged. Further, protective layer 18 may be removed after the silicon etching step, rather than before it. It should also be recognized that layer 14 in FIGS. 2–4 may be a nitride or oxynitride layer, if a suitable etchant therein is subsequently used.

In summary, the invention provides a high resolution, durable silicon template and a method of making same. The invention distinguishes over the prior art by providing a $SiO_2$ layer on the layer of polycrystalline silicon, which $SiO_2$ layer acts as a mask against the silicon etchant, and also provides a protective coating on the finished template, thereby providing greatly improved resolution of the areas defined by the template and increasing the durability of the template against abrasive damage. The invention further distinguishes over the prior art by using silicon etchant including hydrazine and catechol, thereby providing the advantages of eliminating fogging of the glass substrate.

Although this invention has been illustrated and described in relation to a specific embodiment thereof, those skilled in the art will recognize that variations in placement of parts and in order of manufacturing steps may be made to suit specific requirements without departing from the spirit and scope of the invention.

What is claimed is:

1. A template comprising:

a glass substrate, said glass substrate being transparent to ultraviolet light;

a layer of polycrystalline silicon on said glass substrate, said layer of polycrystalline silicon being patterned, and protective coating means on and coextensive with said layer of polycrystalline silicon for defining the edges of said layer of polycrystalline silicon, said protective coating being chosen from the group consisting of silicon dioxide, silicon nitride, and silicon oxynitride.

2. The template as recited in claim 1 wherein said layer of polycrystalline silicon is less than 10,000 angstrom units thick.

3. The template as recited in claim 1 wherein the thickness of said protective coating is in the range from 50 to several thousand angstrom units.

4. A template for masking ultraviolet light in manufacture of semiconductor devices including a glass substrate, said glass substrate being transparent to ultraviolet light, and a layer of polycrystalline silicon on said glass substrate, said layer of polycrystalline silicon being patterned comprising protective coating means on and coextensive with said layer of polycrystalline silicon for defining the edges of said layer of polycrystalline silicon, said protective coating means being chosen from the group consisting of silicon dioxide, silicon nitride and silicon oxynitride.

5. The template as recited in claim 4 wherein said protective coating means is pyrolitically deposited silicon dioxide.

6. The template as recited in claim 4 wherein said protective coating means is thermally grown silicon dioxide.

* * * * *